May 13, 1969

R. L. NORTON ET AL 3,443,500

PHOTOGRAPHIC FILM MAGAZINE

Filed Dec. 23, 1966

INVENTORS
Robert L. Norton
and
William J. Rosen
Brown and Mikulka
and
Robert E. Corb
ATTORNEYS May 13, 1969　　R. L. NORTON ET AL　　3,443,500
PHOTOGRAPHIC FILM MAGAZINE Filed Dec. 23, 1966　　Sheet 2 of 2

INVENTORS
Robert L. Norton
and
William J. Rosen
BY Brown and Mikulka
and
Robert E. Corb
ATTORNEYS 3,443,500
PHOTOGRAPHIC FILM MAGAZINE
Robert L. Norton, Norfolk, and William J. Rosen, Brighton, Mass., assignors to Polaroid Corporation, Cambridge, Mass., a corporation of Delaware
Filed Dec. 23, 1966, Ser. No. 604,340
Int. Cl. G03b 19/10
U.S. Cl. 95—19       8 Claims

ABSTRACT OF THE DISCLOSURE

A photographic film pack or magazine comprising a light-tight container for a stack of film units with an opening through which the film units can be advanced one at a time leading edge first. A spring in the container supports the leading ends of the first film unit in alignment with the opening in position to be engaged by a film advancement member in the magazine and functions as a light-tight closure for the opening.

---

The present invention is concerned with a film pack or magazine adapted for use in a self-developing camera of the type shown and described in the copending U.S. patent application of Robert L. Norton Ser. No. 604,304, filed on the same date herewith. Each film unit comprises a photosensitive image recording element, a second or image-receiving element secured in face-to-face relation with the image-recording element and a rupturable container of processing liquid and is adapted to be exposed by light transmitted through the image-recording element and then processed by advancement between a pair of pressure-applying members in a camera. The film units are contained entirely within a light-tight container and together with the container are designed to provide for advancement of the film units one at a time from the container to enable exposure and processing of the film units exterior of the container.

An object of the invention is to provide a completely self-contained film magazine of the type described having no leaders projecting therefrom and including means for holding the film units in position to be advanced from the container and sealing the container and characterized a simple construction comprising a minimum of inexpensive, easily assembled components.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
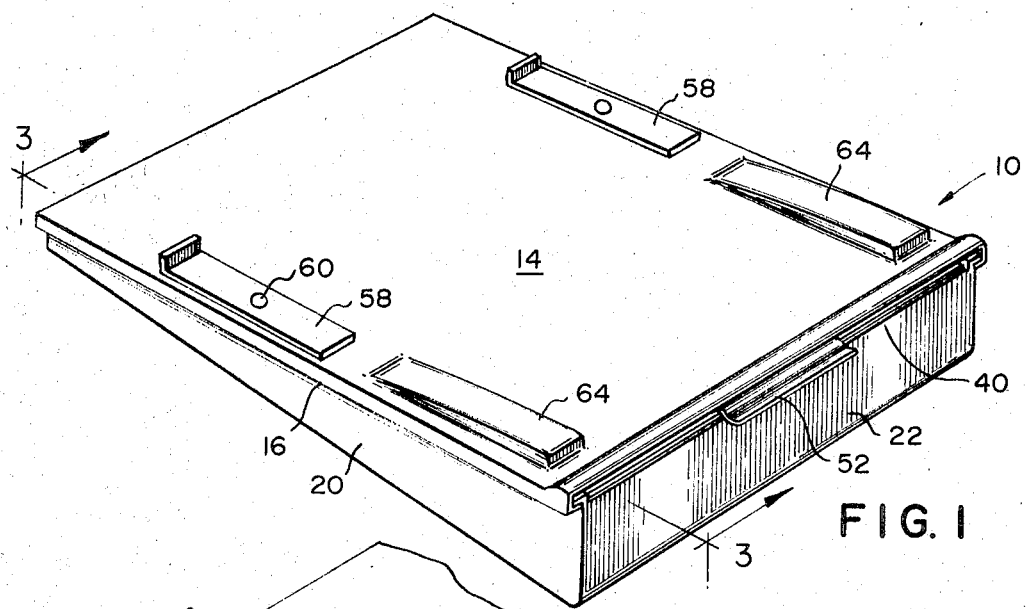
FIG. 1 is a perspective view of a photographic film magazine embodying the invention.
Figure 2:
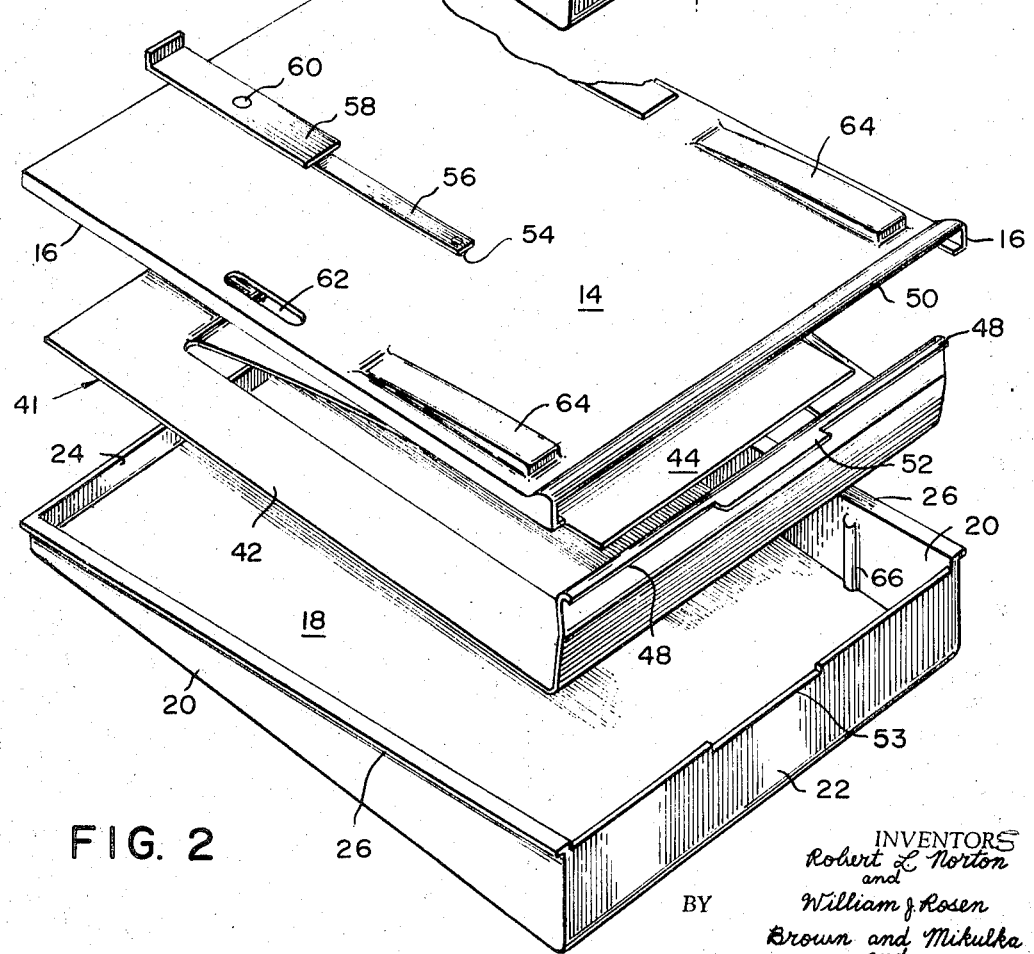
FIG. 2 is an exploded perspective view showing the components of the magazine.
Figure 3:
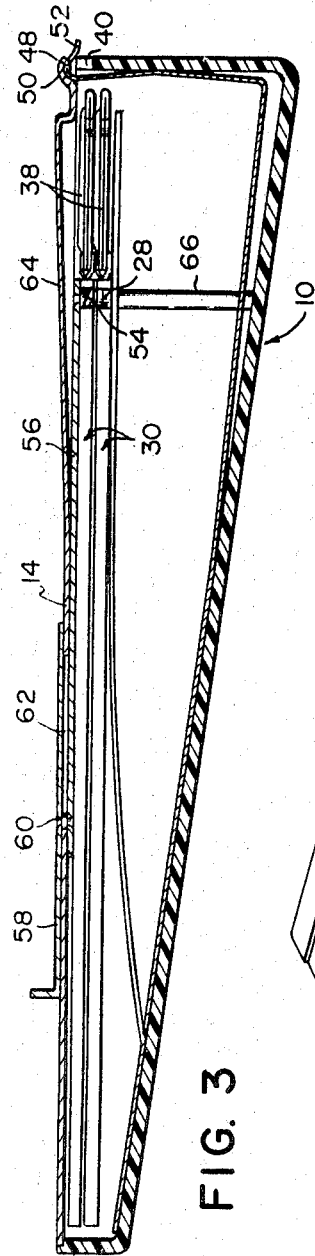
FIG. 3 is a sectional view taken substantially along the line 3—3 of FIGURE 1.

A magazine or film pack embodying the invention is illustrated in the drawings as comprising a container, designated 10, for holding a plurality of film units 12. Container 10 is generally rectangular and relatively elongated and thin and is formed as two sections, designated for the purpose of convenience of description as a forward section and a rear section. The forward section of the container comprises a generally rectangular forward wall 14 having reentrant flanges 16 along its lateral edges forming channels for engaging flanges on the rear section of the container for retaining the two sections together. The rear section of the container is in the form of an open box deeper at one end (termed the "leading" end) than at the other ("trailing") end and comprises a rectangular rear wall 18, side walls 20, a leading end wall 22 and a trailing end wall 24. Side walls 20 are provided at their rear edges with outwardly projecting flanges 26 adapted to be engaged in the channels provided by reentrant flanges 16 on the forward wall in place and forming a light-tight joint between the forward and side walls. The forward section of the container comprising forward wall 14 may be formed of sheet metal or of organic plastic materials and the rear section including the rear, side and end walls is preferably formed of an organic plastic material and is constructed so as to be produced by molding methods.

Figure 4:
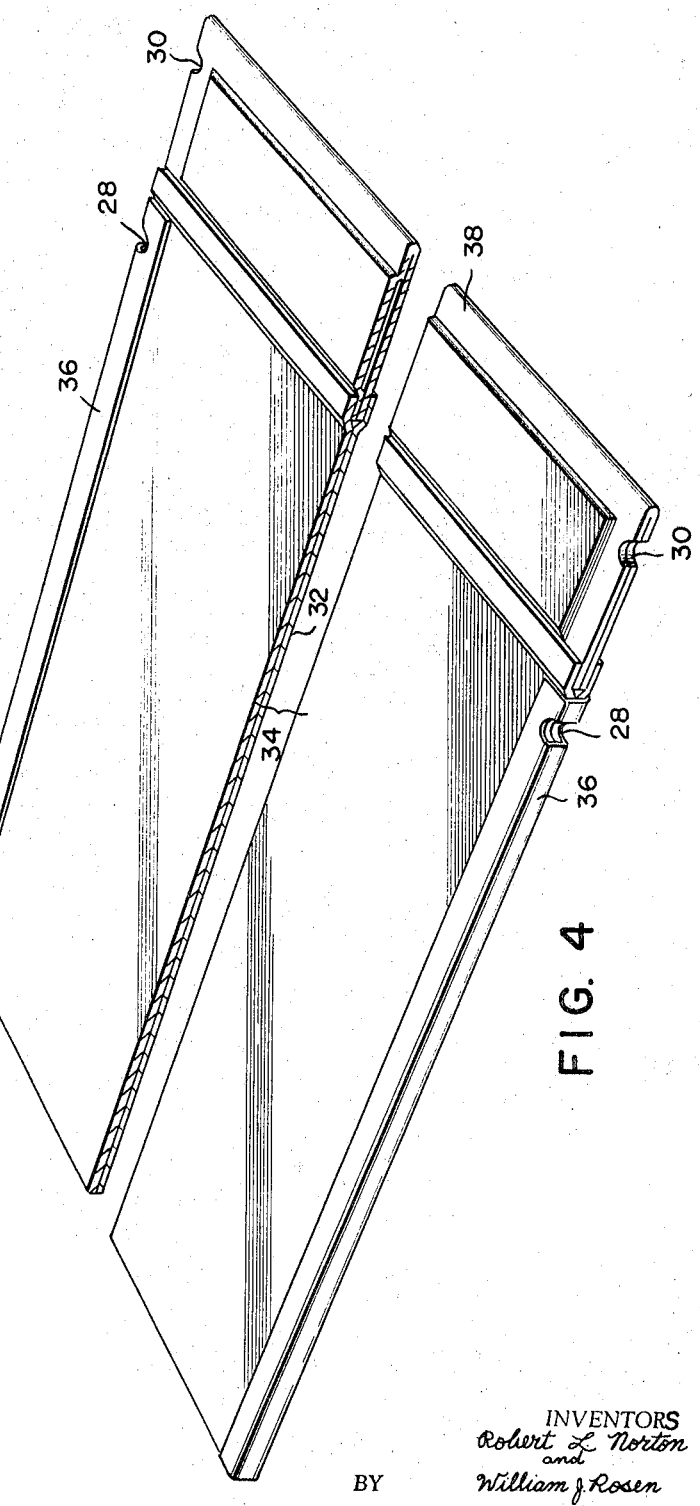
FIG. 4 is a perspective view partially in section of a film unit of the type included in the magazine.

A film unit adapted for incorporation in the film magazine of the invention is shown in detail in FIG. 4 of the drawings. This film unit is of the same general type as shown and described in the U.S. patent of Edwin H. Land, No. 3,053,659, issued Sept. 11, 1962, and comprises a pair of sheet-like elements and a container of processing liquid especially designed for use in processes involving the formation and development of a latent image in a photosensitive image-recording medium and the production of the visible image by the transfer of an imagewise distribution of transferable image-forming substances produced as a result of development of the latent image in the image-recording medium. Film unit comprises a pair of rectangular sheet-like element termed a first or image-recording sheet 32 and a second or image-receiving sheet 34 disposed in face-to-face relation and secured together at least in the region of their leading ends. First sheet 32 provides a support for a layer of a light-sensitive image-recording medium such as a silver halide emulsion and second sheet 34 functions to aid in the distribution of processing liquid between the sheets and, in addition, may provide a support for an image-receptive layer in which a transfer image is formed. The film unit is designed to be exposed outside of the magazine by light transmitted through one of the sheets, preferably the second sheet, which is formed of a transparent material of the type commonly employed as a base for photographic films. Both sheets are rectangular, coextensive in size and secured together with their edges in alignment. In the form shown, sheets 32 and 34 are bound together at their lateral margins by tapes 36.

Each film unit, following exposure of the photosensitive medium thereof, is designed to be processed by a liquid processing agent distributed in a thin layer between the two sheets. The liquid processing agent for treating each film unit is initially supplied in a rupturable container 38 as a component of the film unit and comprises a rectangular blank of air and liquid impermeable sheet material folded lengthwise upon itself and sealed together at its edges to form a cavity for the processing liquid. The longitudinal edge portions of container 38 are sealed together along one side of the cavity so as to become unsealed in response to hydraulic pressure within the liquid produced by applying compressive pressure to the liquid-filled cavity, to form a passage through which the liquid contents of the container are discharged. These longitudinal edge portions defining the discharge passage of the container are secured to and between the leading edge portions of sheets 32 and 34 in position to discharge the liquid contents of the container between the leading ends of the sheets in response to the application of compressive pressure to the container.

A plurality of film units are arranged in stacked relation within container 10 with container 38 located adjacent end wall 22 within the deepest portion of container 10 which, as should be apparent, is tapered to accommodate the greater thickness of container 38 while being as small and compact as possible. End wall 22 cooperates with forward wall 14 to provide a narrow slot 40 extending from side to side of the container and having a width just sufficient to allow the passage of a single film unit at a time.

In accordance with the invention, a single inexpensive and easily formed resilient element is provided for supporting the end film unit of the stack of film units against the forward wall 14 in alignment with slot 40 and for providing a light-tight closure for the slot. This single resilient element, designated 41, is formed of a blank of a resilient sheet material and includes a generally rectangular base section 42 adapted to fit within the container against rear wall 18 between the side and end walls of the container. A tongue 44 is formed from the base section to act as a cantilever spring extending from the trailing end of the container forwardly and toward the leading end of the container for supporting the stack of film units against forward wall 14 of container 10.

As a means for closing slot 40 against the admission of light, element 41 includes an end section 46 extending forwardly from lateral portions of base section 42, adjacent leading end wall 22 across slot 40. The forward edge portion, designated 48, of end section 46 is bent outwardly to form a convex flange adapted to be seated or engaged in a channel 50 formed by deforming the leading edge portion of forward wall 14 defining one side of slot 40. Seating of edge portion 48 in channel 50 provides a light-tight seal for the slot while the curvature of the edge portion also facilitates the advancement of the film units from the film pack container through passage 40. Edge portion 48 is provided with an extension 52 extending from its midportion beyond the end wall of the film pack to provide means adapted to be engaged by a component of the camera for moving edge portion 48 rearwardly to open slot 40 and hold the slot open when the film pack is loaded in the camera. The forward edge of leading end wall 22 is provided with a shallow recess 53 to accommodate extension 52 when edge portion 48 is in an open position.

To facilitate advancement of each film unit from the pack and through a camera during exposure and processing film unit 12 is provided in at least one side thereof with a first notch 28 near the leading end of sheets 32 and 34 and a second notch 30 in container 38 near the leading end of the container. Notch 28 is adapted to be engaged within the film container for advancing the leading end portion of each film unit, i.e., container 38, through slot 40 from container 10 where the film unit may be engaged by components of the camera for continuing the advancement of the film unit from container 10. Means may be provided as a component of the camera and/or as a component of the film magazine for advancing each film unit from the magazine far enough to be engaged by another component of the camera.

In the form of film pack shown, the means for advancing the film units from the magazine comprises a stud 54 adapted to become engaged wit ha notch 28 in the lateral margin of the film unit supported against forward wall 14. Stud 54 is mounted on the end of a resilient support plate 56 mounted on the inside of forward wall 14 adjacene side wall 20 for reciprocating movement toward and away from the leading end wall of container 10. As a means for mounting support plate 56 and stud 54 for sliding movement and engagement with a film unit toward the leading end of the pack, a sliding plate 58 is secured on the outside of forward wall 14 to support plate 56 by a rivet 60 extending through a slot 62 in forward wall 14. Sliding plate 58 serves as a light-tight cover for slot 62 and provides means which may be engaged by a component of the camera for reciprocating support plate 56 and stud 54 to feed successive film units from the magazine. Stud 54 has an inclined rear surface to facilitate disengagement of the stud from notch 28 in a film unit as the film unit is withdrawn from the magazine and/or the stud is returned to its initial position shown in the drawings in which the stud is engaged in a notch in the film unit in readiness to advance the film unit from the magazine. Disengagement of stud 54 from a notch 28 requires bending the support plate 56 forwardly toward forward wall 14 and to enable this deformation of the support plate, the forward wall is provided with an outwardly deformed section 64 providing a recess for accommodating support plate 56 when the latter is bent.

Although the film magazine has been illustrated as comprising two studs 54 and their associated means for mounting and reciprocating the studs, it should be understood that only one stud and its associated means for reciprocating it are required to advance the leading end portions of a film unit from a magazine; and that film units incorporated in such a magazine would require only one notch 28 in one lateral edge for engagement by the single stud 54. Notches 28 perform an additional function and that is preventing movement of all of the film units except the end film unit located against forward wall 14 during movement of the latter from the magazine through slot 40. For this purpose, side wall 20 is provided with an internal rib 66 extending into notches 28 in all but the end film unit for preventing movement thereof, so that as the end film unit is withdrawn from the magazine, the next succeeding film unit is moved forward in its place under the bias of tongue 44 from engagement with rib 66 and into alignment with slot 40 in readiness to be advanced from the magazine. Tongue 44 also functions to support the end film unit in engagement with stud 54 during movement of the end film unit from the magazine.

It will be seen from the aforegoing description that the invention provides a compact, inexpensive and easily assembled film pack or magazine comprising a plurality of self-developing film units and a light-tight container for the film units. The film units are entirely enclosed within the container and the magazine includes means for advancing the film units, one at a time, from the container as well as a single element for both sealing the container against the admission of light and cooperating in the advancement of the film units from the container.

Since certain changes may be made in the above product without departing from the scope of the invention herein involved, it is intended that all matter contained in the above description or shown in the accompanying drawings shall be interpreted as illustrative and not in a limiting sense.

What is claimed is:

1. A magazine for holding and dispensing photographic film units each including a light-sensitive element, said magazine comprising, in combination:

a light-tight container including facing walls and an end wall formed with a narrow opening adjacent one of said facing walls through which film units within said container are movable; and a resilient member mounted within said container between said facing walls against the other of said facing walls, said resilient member including a support section for supporting said film units against said one wall with an end of said film unit closest said one wall in alignment with said narrow opening, and a closure section resiliently biased into a closed position in which said closure section extends toward said one facing wall across and in closing relation to said opening;

said closure section of said resilient member including an engagement portion projecting through said opening in position to be engaged exteriorly of said container to displace said closure section from said closed position toward said other facing wall out of alignment with said opening.

2. A photographic film magazine as defined in claim 1, wherein said resilient member comprises a single blank of a resilient sheet material formed with a base section positioned against said other wall adjacent the end thereof opposite said end wall; said support section extends from said base section toward said end wall and said facing wall, and said closure section comprises supporting portions extending from said base section toward said end wall and a transverse portion extending from the ends of said support portions across said opening.

3. A photographic film magazine as defined in claim 1, wherein said support section comprises a medial portion of said resilient member and said support portions comprise lateral portions of said resilient member.

4. A photographic film magazine as defined in claim 1, including means associated with said one facing wall providing for engagement of said film unit closest said one wall to move said film unit through said opening.

5. A photographic film magazine as defined in claim 4, wherein the last-mentioned means include film engagement means mounted on said one facing wall for reciprocating movement toward and away from said end wall; said film engaging means including means engageable exteriorly of said magazine for moving said engagement means and an engagement member within said magazine for engaging and moving said film unit during movement of said engagement means toward said end wall.

6. A photographic film magazine as defined in claim 4, wherein said last-mentioned means include a slot in said one facing wall adjacent a side thereof extending lengthwise of said container; a pair of engagement members secured to one another in closing relation to said slot on opposite sides of said one facing wall by means passing through said slot; said engagement members being mounted for sliding movement toward and away from said end wall; and said engagement member within said magazine including a projection for engaging and moving said film unit closest said one facing wall during movement of said engagement members toward said wall.

7. A photographic film magazine as defined in claim 6, wherein said engagement member within said magazine is resiliently deformable, is secured at one end to the other of said engagement members, extends toward said end wall, and said projection is mounted on the opposite end of said engagement member.

8. A photographic film magazine as defined in claim 7, wherein said one facing wall is recessed outwardly to permit deformation of said other end portion of said engagement member within said magazine.

References Cited

UNITED STATES PATENTS 2,628,545  2/1953  Kurnick et al. _____ 95—19

NORTON ANSHER, *Primary Examiner.*

D. B. WEBSTER, *Assistant Examiner.*